3,454,639
TETRACYCLINE RECOVERY
Carl O. Putnam, Terre Haute, Ind., assignor to Chas. Pfizer & Co., Inc., New York, N.Y., a corporation of Delaware
No Drawing. Filed Mar. 4, 1966, Ser. No. 531,669
Int. Cl. C07c *103/20*
U.S. Cl. 260—559                                   12 Claims

ABSTRACT OF THE DISCLOSURE

Recovering tetracycline-type antibiotic from an aqueous medium at a pH of from about 6.5 to 10 by mixing from about 0.1 mole to about 0.75 mole of quaternary ammonium salt per mole of antibiotic in the aqueous medium, maintaining the temperature of the medium between about 40° and 75° C., and thereafter recovering the antibiotic quaternary ammonium complex.

---

This invention relates to an improvement in the process for preparing complexes of tetracycline-type antibiotics. More particularly, this invention relates an improvement in the process for forming quaternary ammonium salt complexes with tetracycline-type antibiotics, which comprises heating aqueous systems containing the antibiotic and quaternary ammonium salt to temperatures between about 40° C. and 75° C.

Among the objects of this invention is to reduce the amount of quaternary salt required to complex with the tetracycline-type antibiotic in aqueous solutions and suspensions. U.S. Patent 2,873,276, issued to Edwin W. Blase, claims a process for the extraction of oxytetracycline from fermentation broths in the presence of polyvalent metal ions at a pH of from about 6.5 to about 10 by treating said solutions and suspensions with an excess of an organic base selected from the group which includes quaternary ammonium salts. This patent discloses that somewhat over a three-fold molar excess of the reagent is most successful. U.S. Patent 2,875,247, issued to Sidney Martin Fox et al., claims a process for extracting tetracycline and chlortetracycline from decalcified fermentation mash which comprises adding from about ½ mole to about 3 moles of quaternary ammonium salt per mole of antibiotic. A similar patent, U.S. Patent 3,050,558 issued to Leland Leroy Smith et al., claims the extraction of demethylchlortetracycline by adding from about 0.5 to about 3 moles of a quaternary ammonium compound per mole of antibiotic. The reduction in the requirement of our invention is of particular economic importance when the quaternary ammonium salt is used as an intermediate in the purification of tetracycline-type antibiotics such as in the process claimed in U.S. Patent 3,037,973 to Gasper Sarcona et al. This patent discloses the use of about 500 ml. of a 50% solution of Arquad C, a mixture of quaternary ammonium salts, per kilogram of tetracycline or about 0.5 mole of salt per mole of tetracycline.

While the use of quaternary ammonium salts to form complexes with tetracycline-type antibiotics is well known and is disclosed and claimed in the aforementioned patents, these patents teach the use of from 0.5 to 3 moles of quaternary ammonium salt per mole of antibiotic with preferred amounts ranging from 2 to 3 moles of quaternary ammonium salt per mole of antibiotic. On the other hand, while workers in the art have been cautious of heating tetracycline-type antibiotics, fearing loss of potency, we have unexpectedly found that by elevating the temperature of the antibiotic-containing mixture to from about 40° C. to about 75° C., we obtain not only better yields of the complex but we are also able to reduce the amount of quaternary salt to from about 0.1 mole to 0.75 mole per mole of antibiotic while maintaining a yield of complex at least equivalent to that of the prior art at a substantial reduction in cost. The preferred amount of quaternary ammonium salt useful in this improvement is from 0.1 to 0.4 mole per mole of antibiotic, on the basis of economy.

While the prior art processes were always operated at room temperature and the complex was recovered at room temperature because degradation with consequent loss of antibiotic was expected at elevated temperatures and because precipitation was expected to be more complete at room temperature, we have surprisingly found just the opposite effect, that is we obtain not only yields of complex equivalent to those of the prior art with much less quaternary ammonium salt but also greater yields of complex with equivalent amounts of quaternary ammonium salt when the mixtures are heated at from about 40° C. to about 75° C. Furthermore, we obtain these increased yields regardless of whether the heated mixtures are cooled to room temperature before filtering.

While heating the antibiotic-containing mixture before and after the addition of the quaternary ammonium salt results in increased yields over the prior art method, the preferred method involves heating the mixture prior to the addition of the salt and results in a substantial increase in yield when compared to heating after the addition of the salt. From this it is apparent that the increase in yield is not merely the result of increasing the temperature to facilitate the reaction of antibiotic and quaternary ammonium salt.

Another important advantage derived from the improvement of this invention is that the antibiotic-quaternary ammonium complex which is obtained contains a greater amount of antibiotic and substantially less of the quaternary ammonium compound. As will be exemplified, the prior art methods of complexing the antibiotics produces a product containing about 20% by weight of quaternary ammonium compound while the improvement of this invention permits the preparation of products containing about 7% by weight of quaternary ammonium compound. Another object of this invention is to provide antibacterial compositions comprising tetracycline-type antibiotics having less quaternary ammonium compound and therefore having decreased toxicity and higher potency as, for example, for use in animal feeds.

A further object of this invention is the preparation of quaternary ammonium complexes of tetracycline-type antibiotics, prepared either from aqueous solutions and suspensions of the pure antibiotic, from fermentation broths or clarified broths, which have improved filtering characteristics. The improvement of this invention provides complexes having a filtration rate approximately 25% faster than similar processes without the improvement.

Broadly, this invention is, in the process for obtaining a quaternary ammonium complex of a tetracycline-type antibiotic from an aqueous medium, by reacting the antibiotic and a quaternary ammonium salt having at least one alkyl group of from 8 to 18 carbon atoms in an aqueous medium at a pH of from about 6.5 to about 10, the improvement which comprises the steps of mixing from about 0.1 mole in about 0.75 mole of said quaternary ammonium salt per mole of said tetracycline-type antibiotic at said medium and maintaining the temperature thereof to between about 40° C. and 75° C. and recovering the resulting precipitated tetracycline-type antibiotic-quaternary ammonium complex. More specifically, this invention concerns the process wherein the pH is between about 8.5 and 9.5. Furthermore, this invention specifically includes the process wherein the aqueous medium is heated to from about 50° C. to about 60° C. and also wherein said complex is recovered at a temperature between about 40° C. and 75° C. This invention also includes the process wherein the tetracycline-type antibiotic is oxytetracycline and the process wherein the tetracycline-type antibiotic is tetracycline. The invention further includes the process wherein the medium is heated to a temperature between about 40° C. and 75° C. prior to mixing said quaternary ammonium salt therewith and, more specifically, the process wherein the pH is between about 8.5 and 9.5 and the process wherein said medium is heated to a temperature between about 50° C. to about 60° C. prior to said mixing. The invention further concerns the process wherein the tetracycline-type antibiotic is oxytetracycline and the process wherein the tetracycline-type as well as the process wherein said complex is recovered at a temperature between about 40° C. and 75° C.

The quaternary ammonium base complexes of the antibiotics useful in this invention are formed from any one of several quaternary ammonium salts which contain at least one alkyl group having from 8 to 18 carbon atoms attached to the nitrogen atom. These salts are well known to those skilled in the art and are described in U.S. Patents 2,734,018 and 2,871,264 to P. P. Minieri et al., the previously mentioned U.S. Patent 2,875,247 to S. M. Fox et al., U.S. Patent 3,037,973 to G. Sarcona, U.S. Patent 2,873,276 to Edwin W. Blase, and U.S. Patent 3,050,558 to Leland Leroy Smith.

Useful salts, marketed by the Onyx Chemical Corporation, are Onamine RO, a long chain alkyl-substituted imidazoline, Onyx BTC 927, a mixed alkyldimethyl (dimethylbenzyl) ammonium chloride and Onyx BTC 824, a mixed alkyldimethylbenzylammonium chloride. Other salts, illustrative of the various quaternary compounds useful in this invention are octadecyltrimethylammonium chloride, dodecyltrimethylammonium chloride, cetyltriethylammonium bromide, cetyldimethylbenzylammonium bromide and dodecyldiethylbenzylammonium iodide.

Still other useful quaternary ammonium salts are those described in the aforementioned U.S. Patent 2,873,276 to Edwin W. Blase and include the following:

(a) Long chain alkyl-tri-short chain alkyl ammonium halides wherein the long chain has from 8 to 18 carbon atoms, the short chains have from 1 to 3 carbon atoms and the halide is chloride, bromide or iodide.

(b) Long chain alkyl-di-short chain alkyl-benzylammonium halides wherein the long chain alkyl group has from 8 to 18 carbon atoms, the short chain alkyl groups have from 1 to 3 carbon atoms each and the halide is either chloride, bromide or iodide.

(c) (Medium chain alkyl) benzyl-tri-short chain alkyl ammonium halides wherein the medium chain attaches to the benzyl group (at the ortho, meta or para position) has about 8 carbon atoms and the short chain alkyl groups have from 1 to 3 carbon atoms each. The halide is chloride, bromide or iodide.

(d) Di-medium chain alkyl-di-short chain alkyl ammonium halides wherein the medium chain alkyl groups have from 6 to 18 carbon atoms, and the short chain alkyl groups have from 1 to 3 carbon atoms. The halide is bromide, chloride or iodide.

(e) 1-short chain alkyl-2-long chain alkyl-3-short chain alkyl (or benzyl) imidazolinium halides wherein the short chain alkyl groups has from 1 to 4 carbon atoms, and may be substituted with a hydroxyl group on any one of these carbon atoms. The long chain alkyl group has from 8 to 17 carbon atoms. The halide may be chloride or iodide.

(f) (Medium chain alkyl) phenoxyethoxyethyl di-short chain alkyl-benzylammonium halides wherein the medium chain alkyl is branched or straight, has from 6 to 12 carbon atoms, and is attached at the ortho, meta or para position of the phenoxy group, the short chain alkyls have 1 to 3 carbons each and the halide is chloride, bromide or iodide.

Of the long chain alkyltrimethylammonium chlorides and dialkyldimethylammonium chlorides, the Arquad series of quaternary ammonium salts marketed by Armour and Company, Arquad C, 2C-50, 2C-75, 2HT-75, 2S-75, T-2C and Arquad S-2C are preferred on the basis of availability and ease of handling. The average compositions of the Arquad compounds is given in Table I.

TABLE I.—ARQUAD QUATERNARY AMMONIUM SALTS AVERAGE COMPOSITION OF ACTIVE INGREDIENTS

Alkyltrimethylammonium chlorides (Arquad C)

| Alkyl: | Percent |
|---|---|
| Octyl | 8 |
| Decyl | 9 |
| Dodecyl | 47 |
| Tetradecyl | 18 |
| Hexadecyl | 8 |
| Octadecyl | 5 |
| Octadecenyl | 5 |
| Octadecadienyl | -- |
| Active ingredient | 50 |
| Sodium chloride (approx.) | 1 |
| Isopropanol (approx.) | 36 |
| Water (approx.) | 13.5 |

DIALKYLDIMETHYLAMMONIUM CHLORIDES

| Alkyl | Arquad 2C-50, percent | Arquad 2C-75, percent | Arquad 2HT-75, percent | Arquad 2S-75, percent |
|---|---|---|---|---|
| Octyl | 8 | 8 | | |
| Decyl | 9 | 9 | | |
| Dodecyl | 47 | 47 | | |
| Tetradecyl | 18 | 18 | | |
| Hexadecyl | 8 | 8 | 24 | 24 |
| Octadecyl | 10 | 10 | 75 | 4 |
| Octadecenyl | | | 1 | 30 |
| Octadecadienyl | | | | 42 |
| Active ingredient | 50 | 75 | 75 | 75 |
| Sodium chloride (approx.) | 0.5 | 0.5 | 0.5 | 0.5 |
| Isopropanol (approx.) | 42 | 17 | 18 | 18 |
| Water (approx.) | 7.5 | 7.5 | 6.5 | 6.5 |

MIXED MONOALKYL AND DIALKYL QUATERNARY AMMONIUM CHLORIDES

| Alkyl | Arquad T-2C, percent | Arquad S-2C, percent |
|---|---|---|
| Octyl | 4 | 4 |
| Decyl | 5 | 5 |
| Dodecyl | 23 | 23 |
| Tetradecyl | 10 | 9 |
| Hexadecyl | 17 | 9 |
| Octadecyl | 13 | 10 |
| Octadecenyl | 24 | 18 |
| Octadecadienyl | 4 | 22 |
| Active ingredient | 50 | 50 |
| Sodium chloride (approx.) | 0.5 | 0.5 |
| Isopropanol (approx.) | 36 | 36 |
| Water (approx.) | 13.5 | 13.5 |

Among the tetracycline-type antibiotics wherein the process of this invention is particularly useful are: tetracycline, oxytetracycline, demethylchlortetracycline, chlortetracycline, 7 - chloro-6-demethyltetracycline, bromotetracycline, 6 - demethyltetracyclines, 5a(11a)-dehydrotetracyclines, 6-demethyl-6-deoxytetracycline, 7-chloro and 7-bromo-6-deoxytetracyclines, and the like.

A specific embodiment of the process of this invention comprises adjusting the acidity of an aqueous solution or suspension containing one or more of the aforesaid tetracycline-type antibiotics to a pH of from about 6.5 to about 10 and preferably from about 8.5 to 9.5 with an alkaline reagent such as sodium hydroxide or the like. The antibiotics may be in the form of aqueous solutions or suspensions depending on the solubility of the antibiotic in water and also on the pH of the system. At acid pH, the antibiotics are generally in solutions while at neutral and basic pH's, up to about pH 9, the antibiotics are in the form of suspensions. At higher pH's the antibiotics tend to redissolve. The improved process of this invention may be employed in extracting the antibiotics from fermentation broths, clarified fermentation broths, from aqueous suspensions of the antibotic base and also from solutions of the soluble salts of the antibiotics. While the order in which the steps of the process may be varied and significant improvements in the process and product may be obtained, we have found that the improvement is best carried out by adjusting the pH and heating the medium prior to the addition of the quaternary ammonium salt. We have found that the improvement is effective when the temperature of the mixture is raised to from about 40° C. to about 75° C. While higher temperatures are effective they result in some degradation of the antibiotic. On the basis of efficient processing time and convenience, the preferred temperatures are from about 50° to 60° C. The preferred temperature range yields a product of improved filterability with a minimum of degradation. The time required to complex the antibiotic varies, of course, with the size of the sample. Generally about 10 minutes or less are required to mix and thereby complex a 500 ml. sample containing about 2 million units of antibiotic. Larger plant size runs have been maintained at 60° C. for up to eight hours or more without significant degradation of the antibiotic. The rate at which the temperature is raised will, of course, also be determined by the size of the sample. Rates of from about ½ degree to 5 degrees per minute have been effectively employed in this process. Any of the well known and previously described quaternary ammonium salts are effective in the process of this invention. While the previously mentioned advantages of this invention are most readily realized with amounts of from about 0.1 mole to about 0.75 mole of quaternary ammonium salt per mole of tetracycline-type antibiotic, improvements in yield and rate of filtration are realized when higher mole ratios are employed. Lesser amounts result in less complete precipitation of the antibiotic from aqueous suspensions and solutions.

The advantages of this invention, particularly with regard to economy of operation are most readily realized when the preferred amounts of from about 0.1 mole to about 0.4 mole of quaternary ammonium salt per mole of antibiotic are used. The quaternary ammonium salts may be applied from alcohol solutions, for example, Arquad T-50, a 50% solution of the salts in isopropanol may be used. The salts may also be used in the paste form or as solutions in organic liquids, such as ketones or from aqueous solutions. The complexes formed may be filtered from the media by any one of several methods familiar to those skilled in the art such as suction filtration on filter paper or such means as filter presses for production-size runs. While the complex may be cooled prior to filtration, we have found this unnecessary. Equivalent yields are obtained when the complex is filtered at the complexing temperature thereby further lowering the processing time and cost.

The following examples are given by way of illustration only and are not to be considered as limitations of the scope of this invention:

EXAMPLE I

An aqueous solution, assaying 3700 γ/ml. oxytetracycline by turbidometric assay, was adjusted to pH 9.0 with aqueous sodium hydroxide. Half of the solution was heated to 50° C. and half was allowed to remain at room temperature of from 20 to 22° C. Equal volumes of solution were treated with varying quantities of Arquad T as indicated in Table II. The heated and the room temperature samples were agitated for 30 minutes and filtered by means of a filter press. The heated samples were filtered at 50° C. and the room temperature samples were filtered at 20-22° C. The amount of oxytetracycline which did not complex and remain in the filter cake was determined by assaying the filtrate by the turbidometric assay of the National Formulary, volume XII, page 286.

TABLE II

| | Arquad T | | |
| | Temperature | (Pounds/Billion units oxytetracycline) | (Mole/mole oxytetracycline) | Filtrate assay, oxytetracycline (γ/ml.) |
| --- | --- | --- | --- | --- |
| Sample: | | | | |
| 1 | Room | 1.25 | 0.4 | 228 |
| 2 | Do. | 0.63 | 0.2 | 410 |
| 2A | 50° C. | 0.63 | 0.2 | 202 |

These results indicate that more of the antibiotic complexed with the quaternary ammonium salt and remained in the filter cake when the mixture was heated to 50° C. with half the amount of salt than by not heating the mixture.

EXAMPLE II

Samples from the oxytetracycline solution of Example I, adjusted to pH 9, were treated with increasing amounts of Arquad T as indicated in Table III, and processed according to the procedure of Example I.

TABLE III

| | Arquad T | | |
| | Temperature | (Pounds/billion units oxytetracycline) | (Mole/mole oxytetracycline) | Filtrate assay, oxytetracycline (γ/ml.) |
| --- | --- | --- | --- | --- |
| Sample: | | | | |
| 1 | Room | 1.89 | 0.6 | 157 |
| 2 | do | 1.25 | 0.4 | 228 |
| 2A | 50° C | 1.25 | 0.4 | 135 |
| 3 | Room | 2.52 | 0.8 | 127 |
| 4 | do | 1.89 | 0.6 | 157 |
| 4A | 50° C | 1.89 | 0.6 | 110 |

The results indicate that heating the oxytetracycline and Arquad T salt increases the efficiency of the complexing reaction and allows the use of less quaternary amonium salt with equivalent or better yields.

EXAMPLE III

An aqueous solution of oxytetracycline, assaying 3170 γ/ml., was adjusted to pH 9 and divided into five 500 ml. samples. The samples were heated to the temperatures indicated in Table IV and 0.5 gram Arquad 2C or 0.7 pound/billion units (0.22 mole/mole oxytetracycline) were added. The mixtures were agitated for 30 minutes and filtered at the temperatures indicated. The filtrates were assayed as in Example I with the results indicated in Table IV.

TABLE IV

| | Temperature, (° C.) | Filtrate assay (oxytetracycline, γ/ml.) |
| --- | --- | --- |
| Sample No.: | | |
| 1 | 20-22 | 370 |
| 2 | 40 | 230 |
| 3 | 50 | 247 |
| 4 | 60 | 135 |
| 5 | 75 | 127 |

These results indicate that heating the reaction mixture increases the yield of complex.

A sample of this reaction mixture was maintained for several days in a constant temperature both at 55° C. Samples were removed each day and analyzed for concentration of oxytetracycline by the turbidometric method. About 0.15% of the oxytetracycline was lost each hour indicating that losses of antibiotic due to heating at 55° C. were negligible.

EXAMPLE IV

An aqueous solution of oxytetracycline, assaying 3360 γ/ml., was heated to 50° C. and adjusted to pH 9.0. Varying amounts of Arquad T-2C were added to 500 ml. aliquots of the solution. The mixtures were agitated for 30 minutes and filtered at 50° C. The filtrates were assayed for oxytetracycline and compared to plant runs which were not heated with the results indicated in Table V.

TABLE V

| Sample: | Arquad T-2C | | Filtrate assay (oxytetracycline, γ/ml.) |
|---|---|---|---|
| | (Pounds/billion units oxytetracycline) | (Moles/mole oxytetracycline) | |
| 1 | 0 | 0 | 425 |
| 2 | 0.4 | 0.13 | 275 |
| 3 | 0.67 | 0.2 | 245 |
| 4 | 0.94 | 0.3 | 198 |
| 5 | 1.2 | 0.4 | 187 |
| Plant Run | 1.2 | 0.4 | [1] 250 |

[1] Average.

These results indicate that by heating the oxytetracycline and quarternary ammonium salt to 50° C., about half the standard amount of salt can be used with equivalent yields.

EXAMPLE V

Three plant-size runs of oxytetracycline were heated to 50° C., after the pH was adjusted to 9.0 with aqueous sodium hydroxide. Arquad T–50, at a level of 0.52 pound per billion units was added to each run. The final products were assayed and compared to a plant run which was not heated and to which 1.2 pounds of quaternary ammonium salt per billion units was added. The results are given in Table VI.

TABLE VI.—PROCESS DATA

| | Run 1 | Run 2 | Run 3 | Unheated |
|---|---|---|---|---|
| Complexing Temp., °C | 50 | 50 | 50 | 20–22 |
| Quaternary Salt #/BU | 0.52 | 0.52 | 0.52 | 1.2 |
| Mole quat. salt/mole oxytetracycline | 0.17 | 0.17 | 0.17 | 0.4 |
| Product Analysis: | | | | |
| Assay, grams/lb. as oxytetracycline HCl | 253 | 263 | 257 | [1] 170 |
| Quaternary, percent | 6.7 | 7.6 | 7.1 | [1] 23 |

[1] (average)

These results show that by heating the oxytetracycline with the quaternary ammonium salt, less of the salt can be used and a final product is obtained which contains less of the quaternary ammonium salt.

EXAMPLE VI

An aqueous solution of oxytetracycline, assaying 6300 γ/ml., was adjusted to pH 9.0 Arquad T–50, 0.31 pound per billion units or 0.1 mole per mole of antibiotic, was added to 500 ml. aliquots of the solution. Half of the samples were heated before addition of the quaternary ammonium salt and half were heated after addition of the salt. The samples were agitated at the temperatures indicated for 30 minutes and filtered at those temperatures with the results indicated in Table VII.

TABLE VII

| Sample | Temperature, °C. | Filtrate assay (γ/ml. oxytetracycline) |
|---|---|---|
| Before addition of salt: | | |
| 1 | 20–22 | 540 |
| 2 | 40 | 410 |
| 3 | 50 | 278 |
| 4 | 60 | 157 |
| 5 | 75 | 130 |
| After addition of salt: | | |
| 6 | 20–22 | 540 |
| 7 | 40 | 374 |
| 8 | 50 | 358 |
| 9 | 60 | 305 |
| 10 | 75 | 295 |

A significantly greater amount of the oxytetracycline complexed and was retained on the filter when the samples were heated prior to the addition of the quaternary ammonium salt.

EXAMPLE VII

An aqueous solution of oxytetracycline is adjusted to pH 5.5 and heated to 50° C. When Onamine RO is added at a level of 0.355 pound per billion units and the mixture is agitated for 30 minutes, more of the oxytetracycline is complexed and filtered from the solution than when the solution is not heated. Similar results are obtained when the aqueous solution is adjusted to pH 10 before heating to 50° C.

EXAMPLE VIII

When the procedures of Example VII are repeated with aqueous solutions of tetracycline, more of the tetracycline complexes and is filtered from the solution when heated to 75° C., than when the aqueous solutions are not heated.

EXAMPLE IX

When the procedures of Example VIII are repeated with aqueous solutions of tetracycline, more of the tetracycline complexes and is filtered from the solution when heated to 50° C., than when the aqueous solutions are not heated. Similar results are obtained when aqueous solutions and suspensions of chlortetracycline, demethylchlortetracycline 6-demethyltetracycline, bromotetracycline, 5a(11a)-dehydrotetracycline, 6-methyl - 6 - deoxytetracycline, 7-chlortetracycline, and 7-bromotetracycline.

What is claimed is:

1. In the process for obtaining a quaternary ammonium complex of a tetracycline-type antibiotic from an aqueous medium, by reacting the antibiotic and a quaternary ammonium salt having at least one alkyl group of from about 8 to about 18 carbon atoms in an aqueous medium at a pH of from about 6.5 to 10, the improvement which comprises the steps of mixing from about 0.1 mole to about 0.75 mole of said quaternary ammonium salt per mole of said tetracycline-type antibiotic in said medium, maintaining the temperature thereof at between about 40° C. and 75° C. and recovering the resulting precipitated tetracycline-type antibiotic-quaternary ammonium complex.

2. The process of claim 1 wherein the pH is between about 8.5 and 9.5.

3. The process of claim 1 wherein the aqueous medium is heated to from about 50° C. to about 60° C.

4. The process of claim 1 wherein said complex is recovered at a temperature between about 40° C. and 75° C.

5. The process of claim 1 wherein the tetracycline-type antibiotic is oxytetracycline.

6. The process of claim 1 wherein the tetracycline-type antibiotic is tetracycline.

7. The process of claim 1 wherein said medium is heated to a temperature between about 40° C. and 75° C. prior to mixing said quaternary ammonium salt therewith.

8. The process of claim 7 wherein the pH is between about 8.5 and 9.5.

9. The process of claim 7 wherein said medium is heated to a temperature between about 50° C. to about 60° C. prior to said mixing.

10. The process of claim 7 wherein the tetracycline-type antibiotic is oxytetracycline.

11. The process of claim 7 wherein the tetracycline-type antibiotic is tetracycline.

12. The process of claim 7 wherein said complex is recovered at a temperature between about 40° C. and 75° C.

References Cited

UNITED STATES PATENTS 2,875,247  2/1959  Fox et al.
3,050,558  8/1962  Smith et al.

NICHOLAS S. RIZZO, *Primary Examiner.*

ANNE MARIE TIGHE, *Assistant Examiner.*